(12) United States Patent
Puzio

(10) Patent No.: US 6,332,663 B1
(45) Date of Patent: Dec. 25, 2001

(54) METHODS AND APPARATUS FOR MARKING IMAGES AND OBTAINING IMAGE DATA USING A SINGLE MARKING ENGINE PLATFORM

(75) Inventor: Robert E. Puzio, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/335,054

(22) Filed: Jun. 16, 1999

(51) Int. Cl.[7] ................. B41J 29/393; B41J 1/56
(52) U.S. Cl. ............................. 347/19; 400/175
(58) Field of Search ..................... 347/3, 14, 19; 400/175, 149, 692; 358/406, 472, 474

(56) References Cited

U.S. PATENT DOCUMENTS

| 4,872,027 | * | 10/1989 | Buskirk et al. ................. 347/19 |
| 5,033,887 | * | 7/1991 | Bauerle ........................... 400/175 |
| 5,488,223 | * | 1/1996 | Austin et al. .................... 235/375 |

OTHER PUBLICATIONS

Berinato, Scott, "Canon Ink–Jet Can Function as a Scanner," PC Week, vol. 14, No. 31, p. 48 (Canon Computer Systems Product Announcement).

Sotach, John D., "Sensing System for Detecting Failed Jets on Ink Jet Devices," Xerox Dislosure Journal, Sep./Oct. 1988.

* cited by examiner

Primary Examiner—John Barlow
Assistant Examiner—Juanita Stephens
(74) Attorney, Agent, or Firm—Oliff & Berridge, PLC

(57) ABSTRACT

A marking/image pick-up engine includes a platform on which a plurality of marking cartridges may be mounted. At least one of the marking cartridges may be interchanged with an image pick-up cartridge. Scanning, marking, and at least one self-diagnostic function may be performed by the marking/image pick-up engine.

30 Claims, 5 Drawing Sheets

METHODS AND APPARATUS FOR MARKING IMAGES AND OBTAINING IMAGE DATA USING A SINGLE MARKING ENGINE PLATFORM

BACKGROUND OF THE INVENTION

1. Field of Invention

This invention relates to marking images and obtaining image data using a single platform, such as a printer platform.

2. Description of Related Art

Ink-jet printers, and other types of printers, are widely used as marking engines. These printers include a printer platform on which a replaceable printer cartridge is detachably mounted.

Meanwhile, image pick-up devices, such as scanners, are used to scan images, convert the scanned image data into a digital format, and transfer and/or store the digitized image data for subsequent reproduction or analysis.

SUMMARY OF THE INVENTION

A user wishing to both print an image and scan an image typically must purchase both a printer and a scanner. This invention provides methods and apparatus for marking images and scanning image data using the same platform. This invention separately provides methods and apparatus for performing self-diagnostic functions in a marking/image pick-up engine in which an image pick-up unit and a marking unit are both installed.

In one exemplary embodiment of the systems and methods according to this invention, a marking/image pick-up engine is provided that includes a platform on which a plurality of marking cartridges are mounted, at least one of which is interchangeable with an image pick-up cartridge. The marking/image pick-up engine may include a function switch that switches between a marking mode and an image pick-up mode. The function switch may include a manual input device and/or a cartridge type detector that automatically detects which type of cartridge is mounted on the platform.

When marking is to be performed, the marking cartridge is mounted on the platform, and marking is performed. When image pick-up is to be performed, the image pick-up cartridge is mounted on the platform, and image pick-up is performed.

Since both a marking cartridge and an image pick-up cartridge can be mounted on the same platform, self-diagnostic functions may be performed by, for example, marking an image with the marking cartridge, scanning the marked image with the image pick-up cartridge in the same pass of the platform, and analyzing the obtained image data.

These and other features and advantages of this invention arc described in or are apparent from the following detailed description of exemplary embodiments.

BRIEF DESCRIPTION OF THE DRAWINGS

Various exemplary embodiments of this invention will be described in detail, with reference to the following figures, in which.

DETAILED DESCRIPTION OF EXEMPLARY EMBODIMENTS

Figure 1:
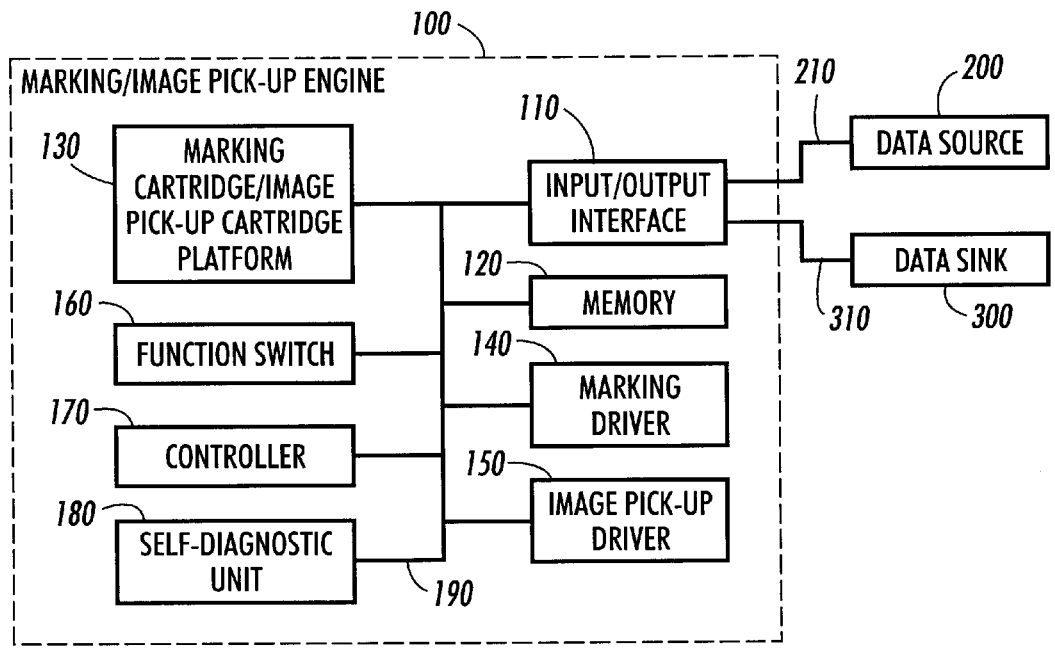
FIG. 1 shows a functional block diagram of one exemplary embodiment of a marking/image pick-up engine according to this invention.

FIG. 1 is a functional block diagram of a marking/image pick-up engine 100. The marking/image pick-up engine 100 may, for example, be any type of ink-jet printer, a thermal head printer that is used in conjunction with heat-sensitive paper, or any other apparatus used to mark an image on a substrate.

The marking/image pick-up engine 100 includes an input/output interface 110, a memory 120, a marking cartridge/image pick-up cartridge platform 130, a marking driver 140, an image pick-up driver 150, a function switch 160, a controller 170 and a self-diagnostic unit 180, all of which are interconnected by a data/control bus 190.

The marking/image pick-up engine 100 is connected to a data source 200 over a signal line or link 210, and to a data sink 300 over a signal line or link 310. The data source 200 provides data to be output by marking a receiving medium. The data sink 300 receives data output by the marking/image pick-up engine 100 when scanning or the like is performed by the marking/image pick-up engine 100, as described in detail below. In general, the data source 200 can be any of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. The data source 200 may also be a data carrier such as a magnetic storage disk, CD-ROM or the like, that contains data to be output by marking.

Thus, the data source 200 can be any known or later developed source that is capable of providing scanned and/or synthetic data to the marking/image pick-up engine 100 according to this invention. Likewise, the data sink 300 can be any known or later developed device or system capable of receiving data output by the marking/image pick-up engine 100 and storing, transmitting and/or reproducing the data. Thus, the data sink 300 can be a printer, a facsimile machine, a digital copier, a host computer, a remotely located computer, or a storage device for indefinitely storing the generated data until there arises a need to analyze, respond to or further transmit the generated data. The storage device can be any known structural apparatus for indefinitely storing the generated data, such as a RAM, a hard drive and disk, a floppy drive and disk, an optical drive and disk, a flash memory or the like.

Each of the links 210 and 310 can be any known or later developed device or system for connecting the image data source and sink 200 and 300 to the marking/image pick-up engine 100, including a direct cable connection, a public switched telephone network, a wireless transmission channel, a connection over a wide area network or a local area network, a connection over an intranet, a connection over the Internet, or a connection over any other distributed processing network or system. In general, each of the links 210 and 310 can be any known or later developed connection system or structure usable to connect the data source 200 and the data sink 300 to the marking/image pick-up engine 100. Further, it should be appreciated that the data source 200 and/or the data sink 300 may be connected to the marking/image pick-up engine 100 directly, as dedicated devices.

The memory 120 is preferably implemented using static or dynamic RAM. However, the memory 120 can also be implemented using a floppy disk and disk drive, a writable optical disk and disk drive, a hard drive, flash memory or the like.

As shown in greater detail in FIG. 3, and as described in greater detail below, the marking cartridge/image pick-up cartridge platform 130 is provided with two cartridge mounting portions, 130A and 130B, each of which accommodates a marking cartridge or an image pick-up cartridge. Thus, the marking cartridge/image pick-up cartridge platform 130 can be used to perform marking, and can also be used to obtain image data. Furthermore, as described below, the marking cartridge/image pick-up cartridge platform 130 can be used to perform at least one self-diagnostic function.

The marking driver 140 drives the marking cartridge/ image pick-Lip cartridge platform 130 when marking is to be performed. The image pick-up driver 150 drives the marking cartridge/image pick-up cartridge platform 130 when image data is to be obtained. The self-diagnostic unit 180 drives the marking cartridge/image pick-up cartridge platform 130, or assists in driving the marking cartridge/ image pick-up cartridge platform 130, when a self-diagnostic function is to be performed. The function switch 160 switches between a marking mode, an image data obtaining mode and a self-diagnostic mode.

Figure 2:
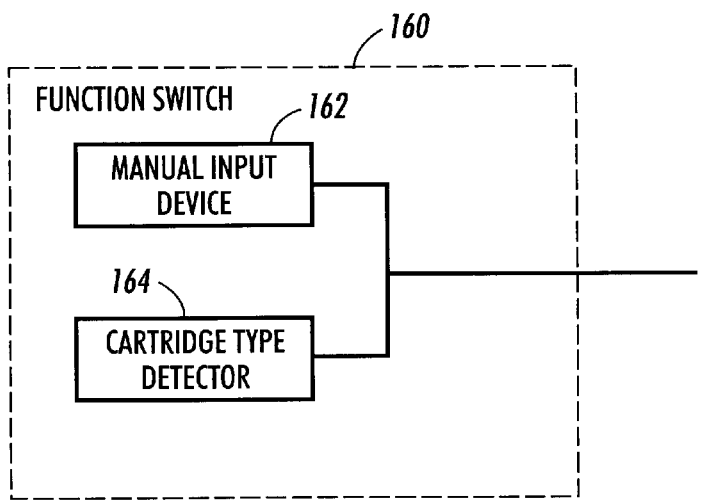
FIG. 2 shows a functional block diagram of one exemplary embodiment of a function switch according to this invention.

As shown in FIG. 2, the function switch 160 may include a manual input device 162 and/or a cartridge type detector 164. It should be appreciated that, instead of including both a manual input device 162 and a cartridge type detector 164, the function switch 160 may include only one of the manual input device 162 and the cartridge type detector 164.

When the marking mode is selected by the function switch 160, data is input from the data source 200 via the input/output interface 110. The incoming data may be, if necessary or desirable, temporarily stored in the memory 120. The marking driver 140 sends the input data to the marking cartridge/image pick-up cartridge platform 130. The marking cartridge/image pick-up cartridge platform 130 marks an image onto a substrate, such as a sheet of paper, via one or more marking cartridges, as will be described in detail below.

When the image data obtaining mode is selected by the function switch 160, the image pick-up driver 150 drives the marking cartridge/image pick-up cartridge platform 130, and causes data to be obtained from an image-bearing substrate by an image pick-up cartridge. The image pick-up cartridge, described in detail below, is mounted on one of the cartridge mounting portion 130A and the cartridge mounting portion 130B of the marking cartridge/image pick-up cartridge platform 130 during the image pick-up mode.

When the self-diagnostic mode is selected by the function switch 160, at least one self-diagnostic function may be performed, provided that at least an image pick-up cartridge is mounted on the marking cartridge/image pick-up cartridge platform 130.

Single-pass self-diagnostic functions entail marking an image on a substrate such as a sheet of paper or the like, and then scanning the marked image in the same pass of the marking cartridge/image pick-up cartridge platform 130 with respect to the substrate. Multi-pass self-diagnostic functions entail scanning a substrate such as a sheet of paper or the like, or a permanently-mounted test pattern provided opposite to an image pick-up portion of the image pick-up cartridge, and detecting a previously-formed feature such a paper edge, a previously-marked image, a test pattern, or the like.

When both an image pick-up cartridge and a marking cartridge are mounted on the marking cartridge/image pick-up cartridge platform 130, both single-pass and multi-pass self-diagnostic functions may be performed. For single-pass self-diagnostic functions, the marking cartridge can mark a specified image, the image pick-up cartridge can scan the image marked by the marking cartridge, and the self-diagnostic unit 180 can perform at least one self-diagnostic function based on data received from the image pick-up cartridge. Single-pass self-diagnostic functions, such as detecting non-firing marking elements, detecting marking element directionality defects, detecting paper advance characteristics, and the like, rely on more precise alignment of the image pick-up cartridge with respect to the marking cartridge than multi-pass self-diagnostic functions, and hence typically require that the image data to be obtained for the self-diagnostic function be obtained in the same pass as the marking of the data.

When at least an image pick-up cartridge is mounted on the marking cartridge/image pick-up cartridge platform 130, at least one multi-pass self-diagnostic function may be performed. For multi-pass self-diagnostic functions, the image pick-up cartridge scans a previously-formed feature such a paper edge, a previously-marked image, a test pattern or the like. For example, multi-pass self-diagnostic functions such as color registration analysis, paper registration variances, edge detection, image pick-up alignment and/or calibration and/or the like may be performed.

In color registration analysis, for example, if the image pick-up cartridge has color capabilities and has sufficient resolution, the image pick-up cartridge may scan a color image that has been previously marked by a marking cartridge. From the scanned data, it may be determined whether respective color layers of the color image are properly aligned with each other.

If a test page is provided with a test image formed thereon, the image pick-up cartridge can scan the test image, and image pick-up alignment and/or calibration can be performed.

Additionally, cartridge-positioning variance can be determined using a test page with a test pattern. The test pattern would have at least one marking at one or more specific positions. The image pick-up cartridge would scan the at least one marking, and the self-diagnostic unit 180 would compare where the at least one marking was detected to where it was expected to be.

If a test pattern is permanently mounted in the cartridge path where an image pick-up portion of the image pick-up cartridge can pass over it, certain self-diagnostics can be performed without feeding a sheet. For example, image pick-up alignment and/or calibration can be performed using such a permanently-mounted test pattern.

Alignment could also be achieved by using paper edge detection. For example, the image pick-up cartridge could be scanned across a paper edge, and the self-diagnostic unit 180 could detect whether two image pick-up elements of the image pick-up cartridge cross the paper edge at the same time. The self-diagnostic unit 180 could detect any misalignment of the image pick-up cartridge with respect to the paper edge, and the degree of such misalignment, based on the respective times at which the two image pick-up elements cross the paper edge.

Also, bi-direction offset diagnostics can be performed if a test pattern is mounted as described above. This does not require any paper to be loaded. Additionally, using side and top edge detection, paper registration variance can be detected without image marking. Furthermore, paper (non-transparency) width can be detected to avoid marking outside of the paper area.

It should be appreciated that multi-pass self-diagnostics may be performed with only the image pick-up cartridge mounted. However, it should also be appreciated that while some self-diagnostic functions are not required to be performed in a single pass, there is nonetheless nothing which prevents them from being performed in a single pass. Similarly, if it is possible to determine which marking element created which image features, it should be possible to perform the above-outlined single-pass self-diagnostic functions using the multi-pass procedure outlined above. For example, paper edge detection and/or image processing algorithms may be used to properly register an image pick-up cartridge with respect to an image previously formed by a marking cartridge.

A default self-diagnostic function may be performed when starting up the marking/image pick-up engine 100 when the marking/image pick-up engine 100 detects that both a marking cartridge and an image pick-up cartridge are mounted on the marking cartridge/image pick-up cartridge platform 130, if the default self-diagnostic function is a single-pass self-diagnostic function, or that at least an image pick-up cartridge is mounted, if the default self-diagnostic function is a multi-pass self-diagnostic function. Alternatively or additionally, the self-diagnostic unit 180 may contain or be connected to an input device (not shown) that allows an operator to arbitrarily designate a self-diagnostic function and/or a time at which the self-diagnostic function is to be performed.

Data obtained via the image pick-up cartridge may be transmitted directly to the data sink 300 via the input/output interface 110, or may transferred to the data sink 300 after being temporarily stored in the memory 120. Alternatively, data may be stored in the memory 120, the operating mode of the marking/image pick-up engine 100 changed to the marking mode, and the data then transferred back to the marking cartridge/image pick-up cartridge platform 130 to be output by marking using one or more marking cartridges.

Data flow between the input/output interface 110, the memory 120, the marking driver 140, the image pick-up driver 150, the marking cartridge/image pick-up cartridge platform 130, the function switch 160 and the self-diagnostic unit 180 is performed under control of the controller 170. It should be appreciated that the controller 170 need not be an independent device within the marking/image pick-up engine 100, and may be part of the marking driver 140 and/or the image pick-up driver 150, for example. Alternatively, the controller 170 may be part of an external device, such as a personal computer or the like, where the marking/image pick-up engine 100 is controlled via the input/output interface 110.

It should be understood that the marking driver 140, the image pick-up driver 150, the controller 170 and/or the self-diagnostic unit 180 of the marking/image pick-up engine 100 shown in FIG. 1 can be implemented as portions of a suitably programmed general purpose computer. Alternatively, any or all of these systems can be implemented as physically distinct hardware circuits within an ASIC, or using a FPGA, a PDL, a PLA or a PAL, or using discrete logic elements or discrete circuit elements. The particular form each of the systems shown in FIG. 1 will take is a design choice and will be obvious and predictable to those skilled in the art.

Moreover, the marking driver 140, the image pick-up driver 150, the controller 170 and/or the self-diagnostic unit 180 of the marking/image pick-up engine 100 can be implemented as software executed on a programmed general purpose computer, a special purpose computer, a microprocessor or the like. In this case, the marking/image pick-up engine 100 can be implemented as a routine embedded in a printer driver, as a resource residing on a server, or the like. Any or all of the marking driver 140, the image pick-up driver 150, the controller 170 and the self-diagnostic unit 180 of the marking/image pick-up engine 100 can also be implemented by physically incorporating it into a software and/or hardware system, such as the hardware and software systems of a printer.

Figure 3:
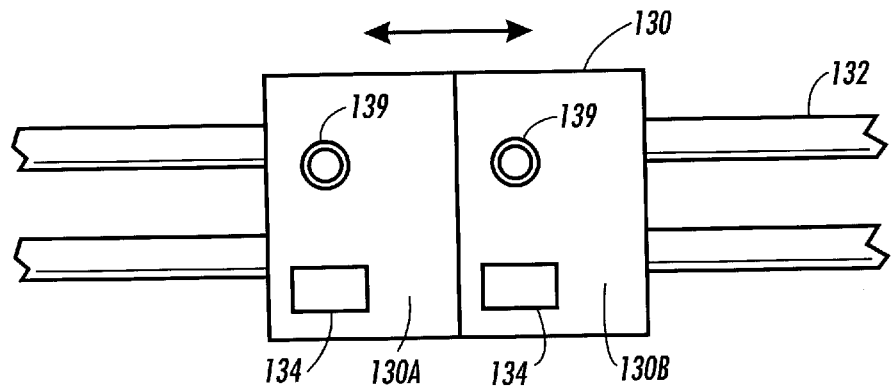
FIG. 3 shows an example of a marking engine platform according to this invention.

FIG. 3 illustrates an exemplary structure of the marking cartridge/image pick-up cartridge platform 130. In FIG. 3, the marking cartridge/image pick-up cartridge platform 130 reciprocates in a back-and-forth direction on one or more guide rails 132. The marking cartridge/image pick-up cartridge platform 130 is provided with the two cartridge mounting portions, 130A and 130B, each of which contains an electrical connection component 134. Electrical signals are transferred to and from each electrical connection component 134 through a flexible electrical cable 136, which is connected to the data/control bus 190 shown in FIG. 1.

Each cartridge mounting portion 130A and 130B of the marking cartridge/image pick-up cartridge platform 130 may also be provided with a cartridge type detection switch 139. Each cartridge type detection switch 139 may, for example, be a push-button switch that has an "ON" state while it is being pressed and held, and an "OFF" state while it is not being pressed and held. Each cartridge type detection switch 139 is in communication with the cartridge type detector 164 of the function switch 160, if provided, either over the data/control bus 190 or directly.

While each of the cartridge mounting portions 130A and 130B shown in FIG. 2 has a cartridge type detection switch 139, it should be appreciated that, if only a certain one of the cartridge mounting portions 130A and 130B is to be used for more than one cartridge type, a cartridge type detection switch 139 on only that one of the cartridge mounting portions 130A and 130B will suffice.

Figure 4:
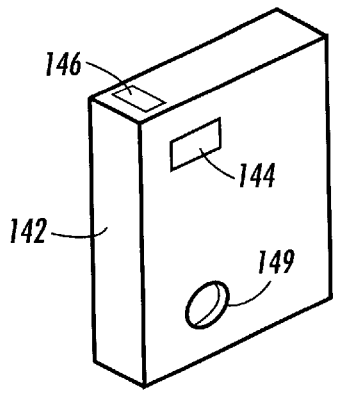
FIG. 4 shows an exemplary embodiment of a first marking cartridge according to this invention.

FIG. 4 shows an example of a first marking cartridge 142 according to this invention. The marking cartridge 142 is mountable on the cartridge mounting portion 130A and/or 130B of FIG. 3, and has an electrical connection portion 144 that corresponds positionally to and mates with either the electrical connection portion 134 of the cartridge mounting portion 130A or the electrical connection portion 134 of the cartridge mounting portion 130B when the marking cartridge 142 is mounted on the respective cartridge mounting portion 130A or 130B. The marking cartridge 142 also has a marking element portion 146, which will be described in detail below. The marking cartridge 142 may, for example, be a marking cartridge containing black marking material.

Additionally, the marking cartridge 142 contains a recess 149 which corresponds positionally to the cartridge type detecting switch 139 of the cartridge mounting portion 130A or 130B. The recess 149 has a sufficient depth such that, when the marking cartridge 142 is mounted on the cartridge mounting portion 130A or 130B, the cartridge type detecting switch 139 is not depressed, and remains in the "OFF" state. The "OFF" state may serve as an indication that a marking operation is to be performed.

Figure 5:
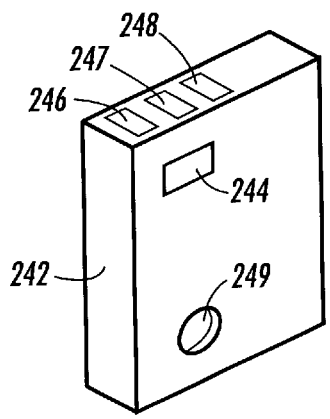
FIG. 5 shows an exemplary embodiment of a second marking cartridge according to this invention.

FIG. 5 shows an example of a second marking cartridge 242 according to this invention. The second marking cartridge 242 is mountable on the cartridge mounting portion 130A and/or 130B of FIG. 3, and includes an electrical connection portion 244, corresponding to the electrical connection portion 144, that corresponds positionally to and mates with either the electrical connection portion 134 of the cartridge mounting portion 130A or the electrical connection portion 134 of the cartridge mounting portion 130B when the marking cartridge 242 is mounted on the respective cartridge mounting portion 130A or 130B. The second marking cartridge 242 also has first, second and third marking element portions 246–248, which will be described in detail below. The second marking cartridge 242 may, for example, be a marking cartridge containing colored marking materials, such as cyan, magenta and yellow marking materials, which are ejected respectively from the marking element portions 246–248.

Additionally, the second marking cartridge 242 contains a recess 249, which is structurally and positionally similar to the recess 149 of the first marking cartridge 142.

Figure 6:
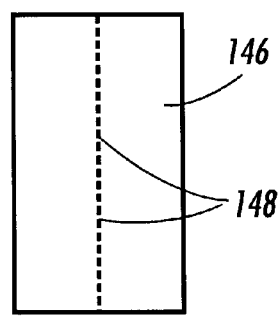
FIG. 6 shows an enlarged plan view of a marking clement portion of the marking cartridge of FIG. 4.

FIG. 6 shows an enlarged plan view of one exemplary embodiment of the marking element portion 146 of the first marking cartridge 142. The marking element portion 146 contains marking elements 148, which are individually controlled to perform marking on a substrate, based on data received from the data source 200, and/or on data received from the marking driver 140 of the marking/image pick-up engine 100, via the electrical connection portion 144 of the marking cartridge 142, the electrical connection portion 134 of the marking cartridge/image pick-up cartridge platform 130, the flexible electrical cable 136 and the bus 190, and possibly the input/output interface 110.

It should be appreciated that the number, size and configuration of the marking elements 148 are not limited to that shown in the exemplary embodiment of the marking element portion 146 shown in FIG. 6. For example, there may be up to several hundred marking elements on a single marking element portion. Additionally, the configuration need not be linear, as shown, but may be staggered or two-dimensional, for example. The marking element portions 246–248 of the second marking cartridge 242 are similar to the marking element portion 146 of the first marking cartridge 142.

Figure 7:
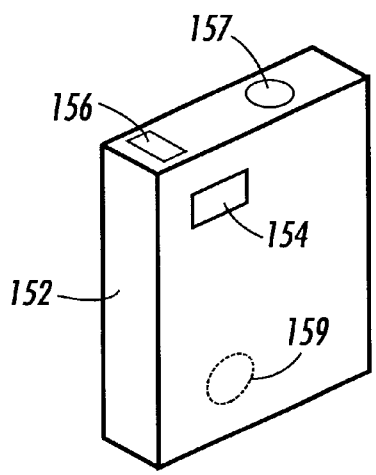
FIG. 7 shows an exemplary embodiment of an image pick-up cartridge according to this invention.

FIG. 7 shows an exemplary embodiment of an image pick-up cartridge 152 according to this invention. The image pick-up cartridge 152 is mountable on the cartridge mounting portion 130A and/or 130B of FIG. 3, and has an electrical connection portion 154 that corresponds positionally to, and is matable with, either the electrical connection portion 134 of the cartridge mounting portion 130A or the electrical connection portion 134 of the cartridge mounting portion 130B when the image pick-up cartridge 152 is mounted on the respective cartridge mounting portion 130A or 130B. The image pick-up cartridge 152 also has an image pick-up portion 156 and a light source 157. The light source 157 is activated during image pick-up to enable the image pick-up portion 156 to optically function. It should be appreciated that, rather than being provided on the image pick-up cartridge 152, the light source 157 may be provided on the marking cartridge/image pick-up cartridge platform 130, or at a stationary location elsewhere within a housing (not shown) that accommodates the marking cartridge/image pick-up cartridge platform 130. Additionally, if the image pick-up portion 156 can operate sufficiently using ambient light normally available in a well-lighted room, the light source 157 may be omitted.

It should be appreciated that the image pick-up cartridge 152 may be any suitable image pick-up device, and does not necessarily have to have a size and shape identical to that of the marking cartridge 142.

In FIG. 7, the region 159 within the dotted line illustrates a portion of the image pick-up cartridge 152 that corresponds positionally to the cartridge type detecting switch 139 of the cartridge mounting portion 130A or 130B. When the image pick-up cartridge is mounted on the cartridge mounting portion 130A or 130B, the cartridge type detection switch 139 is depressed and held by the region 159, and thus placed in the "ON" state. The "ON" state of the depressed cartridge type detection switch 139 may serve as an indication that an image obtaining operation is to be performed.

Alternatively, the operation mode selection could be performed manually as described above. Specifically, as stated, the function switch 160 may include a manual input device 162 in addition to or instead of the cartridge type detector 164. It should be appreciated that, when a manual input device is provided that allows a user to manually set the operation mode, the cartridge type detection switches 139 and the corresponding recesses 149 of the first and second marking cartridges 142 and 242 are not necessary.

While the exemplary embodiments outlined above have been described in which the "OFF" state of the cartridge type detection switch indicates a marking mode and the "ON" state indicates an image obtaining mode, it should be appreciated that the converse could easily be implemented by suitably altering the structure of the cartridge type detection switches 139 and/or the cartridges 142, 242 and 152.

Figure 8:
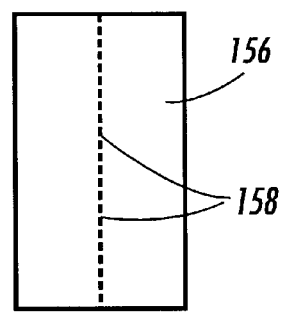
FIG. 8 shows an enlarged plan view of an image pick-up element portion of the image pick-up cartridge of FIG. 7.

FIG. 8 shows an enlarged plan view of the image pick-up portion 156. The image pick-up portion 156 includes image pick-up elements 158, which are individually controlled to obtain image data from an image-bearing substrate. Data obtained by the image pick-up elements 158 is sent to the self-diagnostic unit 180 and/or the data sink 300 via the electrical connection portion 154 of the image pick-up cartridge 152, the electrical connection portion 134 of the marking cartridge/image pick-up cartridge platform 130, the flexible electrical cable 136, and the bus 190, and possibly the input/output interface 110. Alternatively, the data is sent to the memory 120 and temporarily stored.

The image pick-up elements 158 may be, for example, a charge-coupled device or light sensing diodes, photo-multipliers, photo transistors, diode emitter pairs (combines light source and sensor) or other known or later-developed light sensors. The image pick-up elements 158 may be provided in a number corresponding to the number of marking elements of the marking cartridge 142. Alternatively, if more or less resolution is desired or required, a greater or lesser number of image pick-up elements may be provided, and/or multiple passes may be used.

In the simplest form, the image pick-up elements 158 may be one-bit elements capable of obtaining and transmitting only one bit of information per pixel (e.g., whether the scanned pixel space is black or white). Such one-bit pick-up is sufficient for picking up text information, for example. If desired or necessary, the scanned text data may be reconstructed by text reconstruction software, such as optical character recognition software. In this case, the speed of the marking cartridge/image pick-up cartridge platform 130 may need to be reduced to allow a longer image pick-up time.

If more advanced image pick-up is desired, the image pick-up cartridge may be adapted to pick up more than one bit of information per pixel. Adding additional bits allows gray scale, or even color, image data to be obtained.

The data from the image pick-up elements 158 is preferably serialized before being transmitted from the marking cartridge/image pick-up cartridge platform 130. Those skilled in the art will understand how to implement data serialization according to known methods.

Using the marking/image pick-up engine 100 and the cartridges 142, 242 and 152 described above, various modes of operation are possible. For example, in one mode, the marking cartridges 142 and 242 may be mounted on respective ones of the cartridge mounting portions 130A and 130B, and four- or six-color marking may be performed.

In another mode, one of the marking cartridges 142 and 242 may be interchanged with the image pick-up cartridge 152, or both of the marking cartridges 142 and 242 may be interchanged with separate image pick-up cartridges 152, and image data may be obtained. In other words, the marking/image pick-up engine 100 could function in this mode as a scanner, a facsimile machine, an image data input unit of a digital copier or the like. Using more than one scanning cartridge allows the resolution and/or the scanning speed to be increased.

In yet another mode, one of the marking cartridges 142 or 242 may be mounted on one of the cartridge mounting portions 130A and 130B, and the image pick-up cartridge 152 may be mounted on the other of the cartridge mounting portions 130A and 130B. In this mode, at least one self-diagnostic function may be performed by the self-diagnostic unit 180 by causing the marking cartridge 142 to mark a test image, and then simultaneously scanning the marked test image with the image pick-up cartridge 152. As stated above, various self-diagnostic functions may be implemented, such as paper registration, paper advance variances, bi-direction offset, jet failures, multiple head convergence/divergence and offsets, head skew, cartridge positioning variances.

Figure 9:
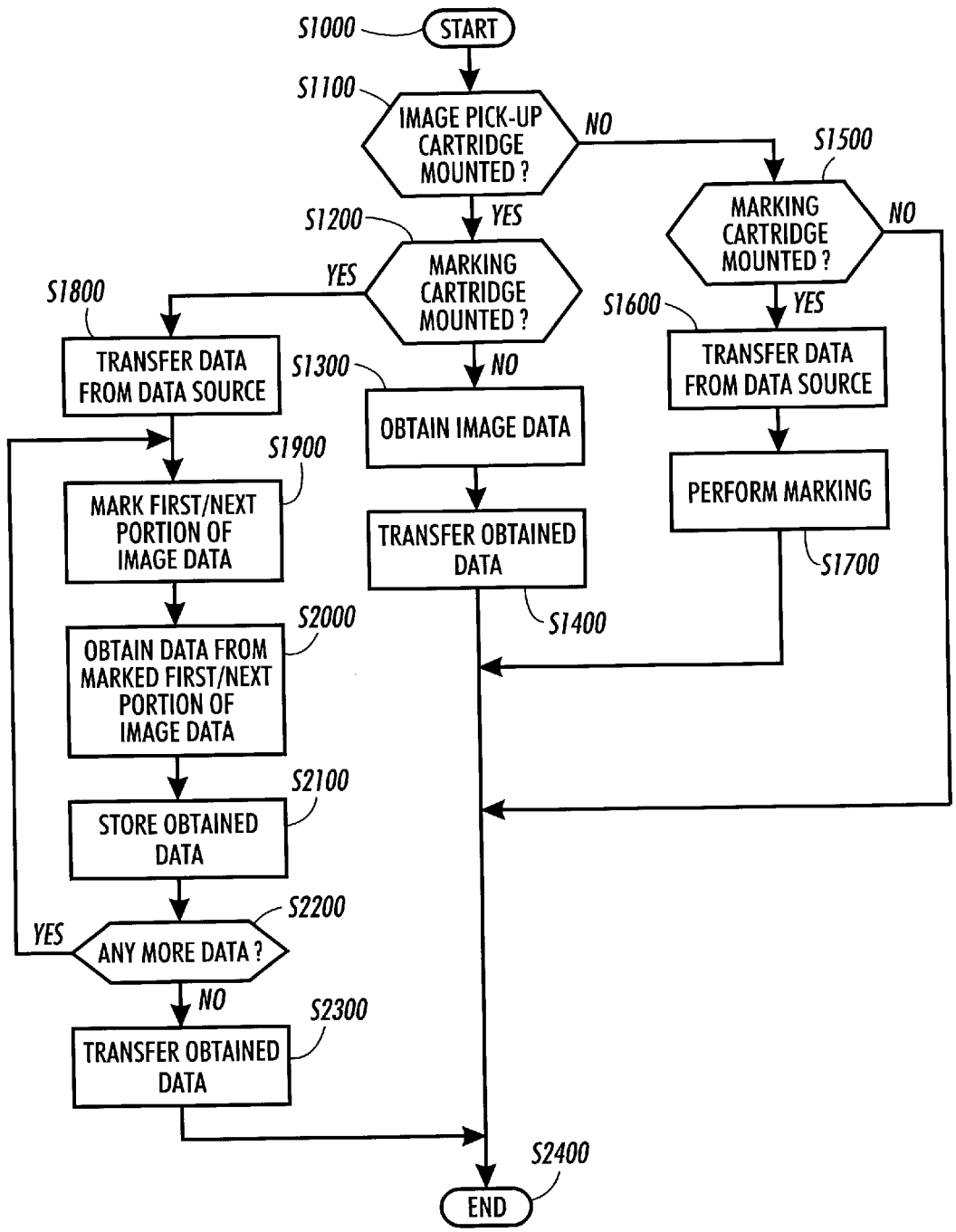
FIG. 9 is a flowchart outlining one exemplary embodiment of a method of performing marking and/or obtaining image data according to this invention.

FIG. 9 is a flowchart outlining one exemplary embodiment of a method for marking and/or obtaining image data according to this invention. Control begins in step S1000 and continues to step S1100, where it is determined whether an image pick-up cartridge is mounted. If an image pick-up cartridge is mounted, control continues to step S1200. Otherwise, control jumps to step S1500.

In step S1200, it is determined whether a marking cartridge is mounted. If a marking cartridge is mounted, control jumps to step S1800. Otherwise, control continues to step S1300. In step S1300, image data is obtained using the image pick-up cartridge. Then, in step S1400, the obtained data is transferred. Control then jumps to step S2400.

In step S1500, it is determined whether a marking cartridge is mounted. If a cartridge is mounted, control continues to step S1600. Otherwise, control jumps to step S2400.

In step S1600, data that includes at least image data is transferred from a data source. Then, in step S1700, marking is performed. Control then jumps to step S2400.

In step S1800, data that includes at least image data is transferred from a data source. Next, in step S1900, a first portion of the image data is marked using the marking cartridge. Then, in step S2000, data is obtained from the marked first portion of the image data using the image pick-up cartridge. Next, in step S2100, the obtained data is stored. Control then continues to step S2200.

In step S2200, it is determined whether there is more data to be marked and obtained. If there is more data, control returns to step S1900, and steps S1900–S2200 are repeated until all of the image is printed. When it is determined in step S2200 that there is no more data, control continues to step S2300, where the obtained data is transferred. Finally, in step S2400, the control procedure ends.

It should be appreciated that the transfer of data in step S2300 may actually occur before step S2200, or may occur concurrently with step S2200 and/or the repetition of steps S1900–S2200. Furthermore, it should be appreciated that the transfer of data from a data source in step S1800 may continue concurrently with any or all of steps S1900–S2300.

Figure 10:
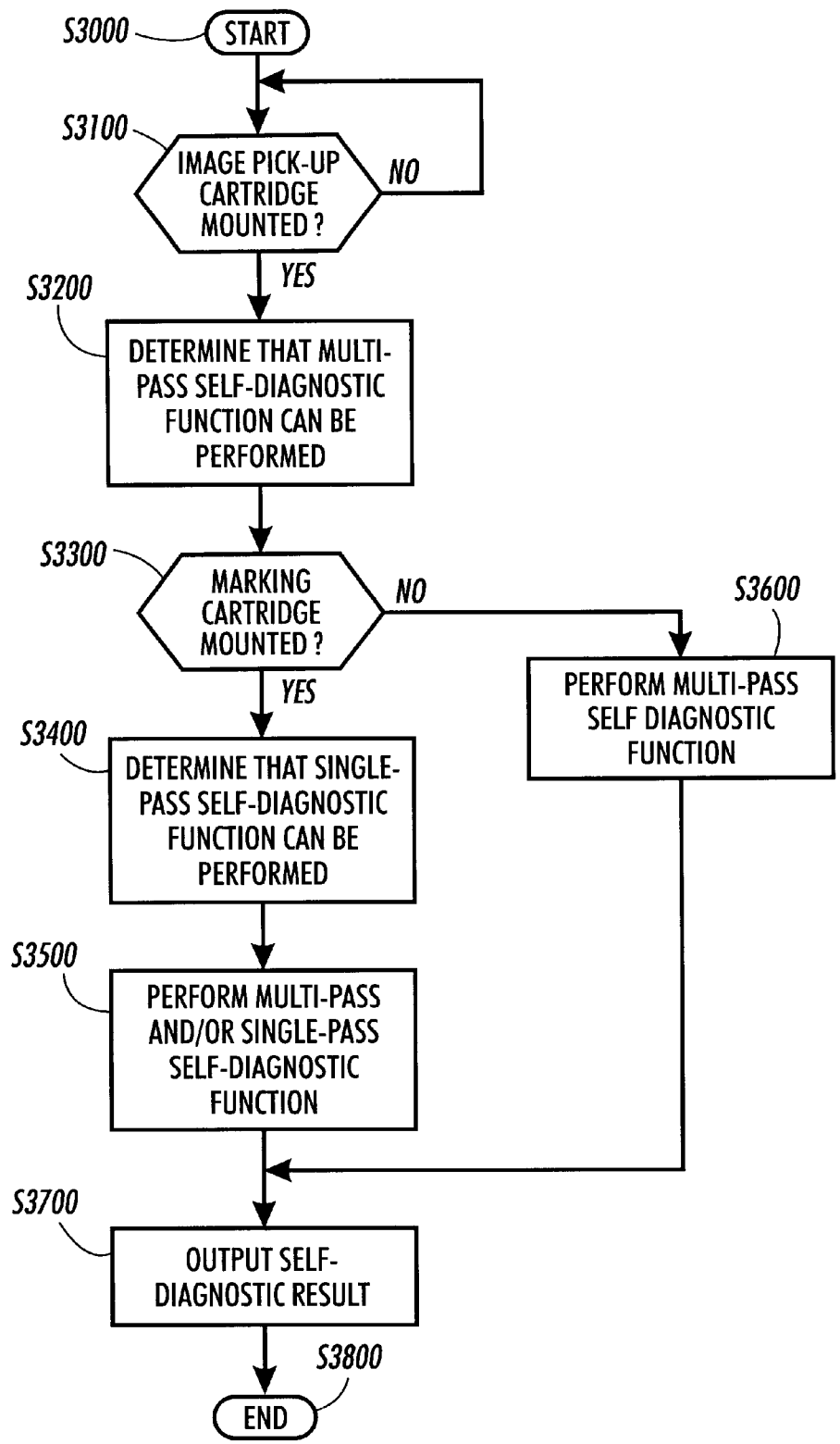
FIG. 10 is a flowchart outlining one exemplary embodiment of a method of performing at least one self-diagnostic function according to this invention.

FIG. 10 is a flowchart outlining one exemplary embodiment of a method of performing at least one self-diagnostic function according to this invention. Beginning in step S3000, control continues to step S3100, where it is determined whether an image pick-up cartridge is mounted. If an image pick-up cartridge is mounted, control continues to step S3200. Otherwise, control returns to and repeats step S3100.

In step S3200, it is determined that at least a multi-pass self-diagnostic function can be performed. Control then continues to step S3300, where it is determined whether a marking cartridge is also mounted. If a marking cartridge is mounted, control continues to step S3400. Otherwise, control jumps to step S3600.

In step S3400, it is determined that single-pass self-diagnostic functions can be performed. In other words, it is determined at this point that either or both of one or more single-pass self-diagnostic functions and one or more multi-pass self-diagnostic functions can be performed. Control then continues to step S3500, and performs either one or more single-pass self-diagnostic functions or one or more multi-pass self-diagnostic functions, or one or more of each. Control then jumps to step S3700.

In step S3600, because a marking cartridge is not also installed with the image pick-up cartridge, only one or more multi-pass self-diagnostic functions are performed. Control then continues to step S3700.

In step S3700, a self-diagnostic result is output. Finally, in step S3800, the control procedure ends.

While the invention has been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

For example, while an exemplary marking cartridge/image pick-up cartridge platform having two cartridge mounting portions has been depicted, a marking cartridge/image pick-up cartridge platform having more than two cartridge mounting portions is also possible. A platform with more than two cartridge mounting portions would, for example, be used in a case where each color of marking medium is provided in a separate cartridge, resulting in a platform with three, four or more cartridge mounting portions.

What is claimed is:

1. A marking/image pick-up engine comprising:
   a platform including:
      a first cartridge mounting portion that operably connects to a first marking cartridge; and
      a second cartridge mounting portion that operably connect to a second marking cartridge;
   wherein at least one image pick-up cartridge is interchangeable with at least one of the first marking cartridge and the second marking cartridge and wherein both said image pick-up cartridge and said first or second marking cartridge are able to operably connect to a respective one of the first cartridge mounting portion and the second cartridge mounting portion and
   wherein a single platform is interoperable between said image pick-up cartridge and said first or second marking cartridge.

2. The marking/image pick-up engine as set forth in claim 1, further comprising a controller that controls the platform to perform marking when at least one of the first marking cartridge and the second marking cartridge are mounted, and controls the platform to obtain image data when at least the image pick-up cartridge is mounted.

3. The marking/image pick-up engine as set forth in claim 2, wherein, when at least the image pick-up cartridge is mounted, the controller controls the platform to perform at least one self-diagnostic function.

4. The marking/image pick-up engine as set forth in claim 3, wherein the at least one self-diagnostic function is at least one multi-pass self-diagnostic function.

5. The marking/image pick-Lip engine as set forth in claim 2, wherein the controller controls the platform to perform at least one self-diagnostic function when the image pick-up cartridge and one of the first marking cartridge and the second marking cartridge are mounted.

6. The marking/image pick-up engine as set forth in claim 5, wherein the at least one self-diagnostic function is at least one single-pass self-diagnostic function.

7. The marking/image pick-up engine as set forth in claim 2, wherein the controller receives a self-diagnostic instruction.

8. The marking/image pick-up engine as set forth in claim 7, wherein the controller further controls the platform to perform at least one self-diagnostic function when at least the image pick-up cartridge is mounted and the self-diagnostic instruction is received.

9. The marking/image pick-up engine as set forth in claim 8, wherein the at least one self-diagnostic function is a multi-pass self-diagnostic function when only the image pick-up cartridge is mounted, and wherein the at least one self-diagnostic function is at least one of at least one multi-pass self-diagnostic function and at least one single-pass self-diagnostic function when the image pick-up cartridge and one of the first marking cartridge and the second marking cartridge are mounted.

10. The marking/image pick-up engine as set forth in claim 2, wherein the controller receives a marking instruction.

11. The marking/image pick-up engine as set forth in claim 10, wherein the controller further controls the platform to perform marking when the image pick-up cartridge and one of the first marking cartridge and the second marking cartridge are mounted and the marking instruction is received.

12. The marking/image pick-up engine as set forth in claim 2, wherein the controller receives an instruction to obtain image data.

13. The marking/image pick-up engine as set forth in claim 12, wherein the controller further controls the platform to obtain image data when at least the image pick-up cartridge is mounted and the instruction to obtain image data is received.

14. The marking/image pick-up engine as set forth in claim 1, wherein the first and second marking cartridges are an ink-jet printer cartridges.

15. The marking/image pick-Lip engine as set forth in claim 1, further comprising a function switch that switches between a marking mode, an image obtaining mode and a self-diagnostic mode.

16. The marking/image pick-up engine as set forth in claim 15, wherein the function switch comprises a manual input device.

17. The marking/image pick-up engine as set forth in claim 15, wherein the function switch comprises a cartridge type detector that comprises a cartridge type detection switch on at least one of the first cartridge mounting portion and the second cartridge mounting portion that detects which of the first marking cartridge, the second marking cartridge and the image pick-up cartridge is mounted on the at least one of the first cartridge mounting portion and the second cartridge mounting portion.

18. A method of performing marking and image pick-up using a single marking/image pick-up engine, the method comprising:
   providing a platform including a first cartridge mounting portion that operably connects to a first marking cartridge, and a second cartridge mounting portion that operably connects to a second marking cartridge;
   providing at least one image pick-up cartridge that is interchangeable with at least one of the first marking cartridge and the second marking cartridge and operably connects to a respective one of the first cartridge mounting portion and the second mounting portion; and
   wherein a single platform is interoperable between said image pick-up cartridge and said first marking or second marking cartridge;
   controlling the platform to perform marking when at least one of the first marking cartridge and the second marking cartridge are mounted; and
   controlling the platform to obtain image data when at least the image pick-up cartridge is mounted.

19. The method as set forth in claim 18, further comprising controlling the platform to perform at least one self-diagnostic function when at least the image pick-up cartridge is mounted.

20. The method as set forth in claim 19, wherein the at least one self-diagnostic function is at least one multi-pass self-diagnostic function.

21. The method as set forth in claim 18, further comprising controlling the platform to perform at least one self-diagnostic function when the image pick-up cartridge and one of the first marking cartridge and the second marking cartridge are mounted.

22. The method as set forth in claim 21, wherein the at least one self-diagnostic function is at least one single-pass self-diagnostic function.

23. The method as set forth in claim 18, further comprising performing at least one self-diagnostic function based on the obtained image data.

24. The method as set forth in claim 23, wherein the steps of performing marking and obtaining image data are performed in a same pass of the platform, the image data comprising data obtained from an image generated by the marking step.

25. The method as set forth in claim 23, wherein the steps of performing marking and obtaining image data are performed in separate passes of the platform.

26. The method as set forth in claim 18, further comprising determining which combination of the first marking cartridge, the second marking cartridge and the image pick-up cartridge is mounted on the platform.

27. The method as set forth in claim 26, wherein the determining step comprises:

providing a cartridge type detector that comprises a cartridge type detection switch on at least one of the first cartridge mounting portion and the second cartridge mounting portion that detects which of the first marking cartridge, the second marking cartridge and the image pick-up cartridge is mounted on the at least one of the first cartridge mounting portion and the second cartridge mounting portion; and determining a cartridge type based on an output of the cartridge type detector.

28. The method as set forth in claim 26, further comprising performing one of marking, data obtaining and a self-diagnostic function based on the determined combination.

29. The method as set forth in claim 28, further comprising indicating which of marking, image pick-up and a self-diagnostic function is to be performed.

30. The method as set forth in claim 29, wherein the indicating step comprises manually inputting an indication of which of marking, image pick-up and a self-diagnostic function is to be performed.

* * * * *